(12) United States Patent
Meiri et al.

(10) Patent No.: US 10,908,828 B1
(45) Date of Patent: Feb. 2, 2021

(54) ENHANCED QUALITY OF SERVICE (QOS) FOR MULTIPLE SIMULTANEOUS REPLICATION SESSIONS IN A REPLICATION SETUP

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/521,730

(22) Filed: Jul. 25, 2019

(51) Int. Cl.
  *G06F 13/00* (2006.01)
  *G06F 3/06* (2006.01)
(52) U.S. Cl.
  CPC .......... *G06F 3/0631* (2013.01); *G06F 3/0604* (2013.01); *G06F 3/065* (2013.01); *G06F 3/0673* (2013.01)
(58) Field of Classification Search
  CPC ...... G06F 3/0631; G06F 3/065; G06F 3/0673; G06F 3/0604
  See application file for complete search history.

(56) References Cited

U.S. PATENT DOCUMENTS

| | | | |
|---|---|---|---|
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |

(Continued)

OTHER PUBLICATIONS

"Design and Implementation of a Qos-Aware Replication Mechanism for a distributed Multimedia System" by On et al., IDMS 2001, LNCS 2158, pp. 38-49 (Year: 2001).*

(Continued)

*Primary Examiner* — Jing-Yih Shyu
(74) *Attorney, Agent, or Firm* — Daly, Crowley Mofford & Durkee, LLP

(57) ABSTRACT

In one aspect, implementing enhanced QoS for multiple replication sessions in a replication setup includes, for each of a number of replication sessions simultaneously implemented via the storage system, determining an assigned priority level and calculating a corresponding resource profile. The resource profile specifies a minimum required amount of bandwidth and a minimum amount of input/output (IO) operations for the replication session. An aspect also includes determining available system resources for an aggregate of the replication sessions. The available system resources indicate a maximum available amount of bandwidth and a maximum available IO rate across the storage system. An aspect further includes apportioning resources among the replication sessions as a function of collective priority levels, resource profiles, and the available system resources.

18 Claims, 4 Drawing Sheets

(56) References Cited

U.S. PATENT DOCUMENTS

| | | | |
|---|---|---|---|
| 7,024,525 B2 | 4/2006 | Yoder et al. | |
| 7,032,228 B1 | 4/2006 | McGillis et al. | |
| 7,051,176 B2 | 5/2006 | Meiri et al. | |
| 7,054,883 B2 | 5/2006 | Meiri et al. | |
| 7,113,945 B1 | 9/2006 | Moreshet et al. | |
| 7,114,033 B2 | 9/2006 | Longinov et al. | |
| 7,174,423 B2 | 2/2007 | Meiri et al. | |
| 7,197,616 B2 | 3/2007 | Meiri et al. | |
| 7,228,456 B2 | 6/2007 | Lecrone et al. | |
| 7,240,116 B2 | 7/2007 | Marshak et al. | |
| 7,292,969 B1 | 11/2007 | Aharoni et al. | |
| 7,376,651 B2 | 5/2008 | Moreshet et al. | |
| 7,380,082 B2 | 5/2008 | Meiri et al. | |
| 7,383,385 B2 | 6/2008 | Meiri et al. | |
| 7,383,408 B2 | 6/2008 | Meiri et al. | |
| 7,386,668 B2 | 6/2008 | Longinov et al. | |
| 7,392,360 B1 | 6/2008 | Aharoni et al. | |
| 7,409,470 B2 | 8/2008 | Halstead et al. | |
| 7,430,589 B2 | 9/2008 | Veprinsky et al. | |
| 7,577,957 B1 | 8/2009 | Kamvysselis et al. | |
| 7,613,890 B1 | 11/2009 | Meiri | |
| 7,617,372 B1 | 11/2009 | Bjornsson et al. | |
| 7,702,871 B1 | 4/2010 | Arnon et al. | |
| 7,870,195 B1 | 1/2011 | Meiri | |
| 7,912,056 B1* | 3/2011 | Brassem | H04L 47/10 370/390 |
| 8,046,545 B2 | 10/2011 | Meiri et al. | |
| 8,078,813 B2 | 12/2011 | LeCrone et al. | |
| 8,332,687 B1 | 12/2012 | Natanzon et al. | |
| 8,335,771 B1 | 12/2012 | Natanzon et al. | |
| 8,335,899 B1 | 12/2012 | Meiri et al. | |
| 8,468,180 B1 | 6/2013 | Meiri et al. | |
| 8,578,204 B1 | 11/2013 | Ortenberg et al. | |
| 8,600,943 B1 | 12/2013 | Fitzgerald et al. | |
| 8,677,087 B2 | 3/2014 | Meiri et al. | |
| 8,694,700 B1 | 4/2014 | Natanzon et al. | |
| 8,706,959 B1 | 4/2014 | Arnon et al. | |
| 8,719,497 B1 | 5/2014 | Don et al. | |
| 8,732,124 B1 | 5/2014 | Arnon et al. | |
| 8,775,549 B1* | 7/2014 | Taylor | H04L 67/1097 709/217 |
| 8,782,357 B2 | 7/2014 | Halstead et al. | |
| 8,812,595 B2 | 8/2014 | Meiri et al. | |
| 8,825,964 B1 | 9/2014 | Sopka et al. | |
| 8,838,849 B1 | 9/2014 | Meiri et al. | |
| 8,862,546 B1 | 10/2014 | Natanzon et al. | |
| 8,914,596 B2 | 12/2014 | Lecrone et al. | |
| 8,966,211 B1 | 2/2015 | Arnon et al. | |
| 8,977,826 B1 | 3/2015 | Meiri et al. | |
| 9,002,904 B1 | 4/2015 | Meiri et al. | |
| 9,009,437 B1 | 4/2015 | Bjornsson et al. | |
| 9,026,492 B1 | 5/2015 | Shorey et al. | |
| 9,026,696 B1 | 5/2015 | Natanzon et al. | |
| 9,037,816 B1 | 5/2015 | Halstead et al. | |
| 9,037,822 B1 | 5/2015 | Meiri et al. | |
| 9,100,343 B1* | 8/2015 | Riordan | H04L 41/5048 |
| 9,110,693 B1 | 8/2015 | Meiri et al. | |
| 9,208,162 B1 | 12/2015 | Hallak et al. | |
| 9,304,889 B1 | 4/2016 | Chen et al. | |
| 9,323,750 B2 | 4/2016 | Natanzon et al. | |
| 9,342,465 B1 | 5/2016 | Meiri | |
| 9,378,106 B1 | 6/2016 | Ben-Moshe et al. | |
| 9,396,243 B1 | 7/2016 | Halevi et al. | |
| 9,418,131 B1 | 8/2016 | Halevi et al. | |
| 9,483,355 B1 | 11/2016 | Meiri et al. | |
| 9,524,220 B1 | 12/2016 | Veprinsky et al. | |
| 9,558,083 B2 | 1/2017 | LeCrone et al. | |
| 9,606,739 B1 | 3/2017 | LeCrone et al. | |
| 9,606,870 B1 | 3/2017 | Meiri et al. | |
| 9,753,663 B1 | 9/2017 | LeCrone et al. | |
| 9,959,063 B1 | 5/2018 | Meiri et al. | |
| 9,959,073 B1 | 5/2018 | Meiri | |
| 10,007,466 B1 | 6/2018 | Meiri et al. | |
| 10,025,843 B1 | 7/2018 | Meiri et al. | |
| 10,055,161 B1 | 8/2018 | Meiri et al. | |
| 10,095,428 B1 | 10/2018 | Meiri et al. | |
| 10,152,527 B1 | 12/2018 | Meiri et al. | |
| 10,238,487 B2 | 3/2019 | Alon et al. | |
| 10,261,853 B1 | 4/2019 | Chen et al. | |
| 10,656,869 B1* | 5/2020 | Greenwood | G06F 3/065 |
| 2003/0208510 A1* | 11/2003 | Doyle | G06F 16/9574 |
| 2005/0114465 A1* | 5/2005 | Coronado | G06F 3/0622 709/214 |
| 2020/0136920 A1* | 4/2020 | Doshi | H04L 41/5009 |

OTHER PUBLICATIONS

"Monitoring self-adaptive applications within edge computing frameworks—A state-of-the-art review" by Taherizadeh et al., 2017 (Year: 2017).*

"Orchestrating Quality of Service in the Cloud of Things Ecosystem" byJayaraman et al., 2015 (Year: 2015).*

"QoS for Consistency of Data Geo-replication in Cloud Computing" by Esteves et al., Euro-Par 2012 LNCS 7484 pp. 285-297 (Year: 2012).*

U.S. Appl. No. 15/001,789, filed Jan. 20, 2016, Meiri et al.
U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.

* cited by examiner

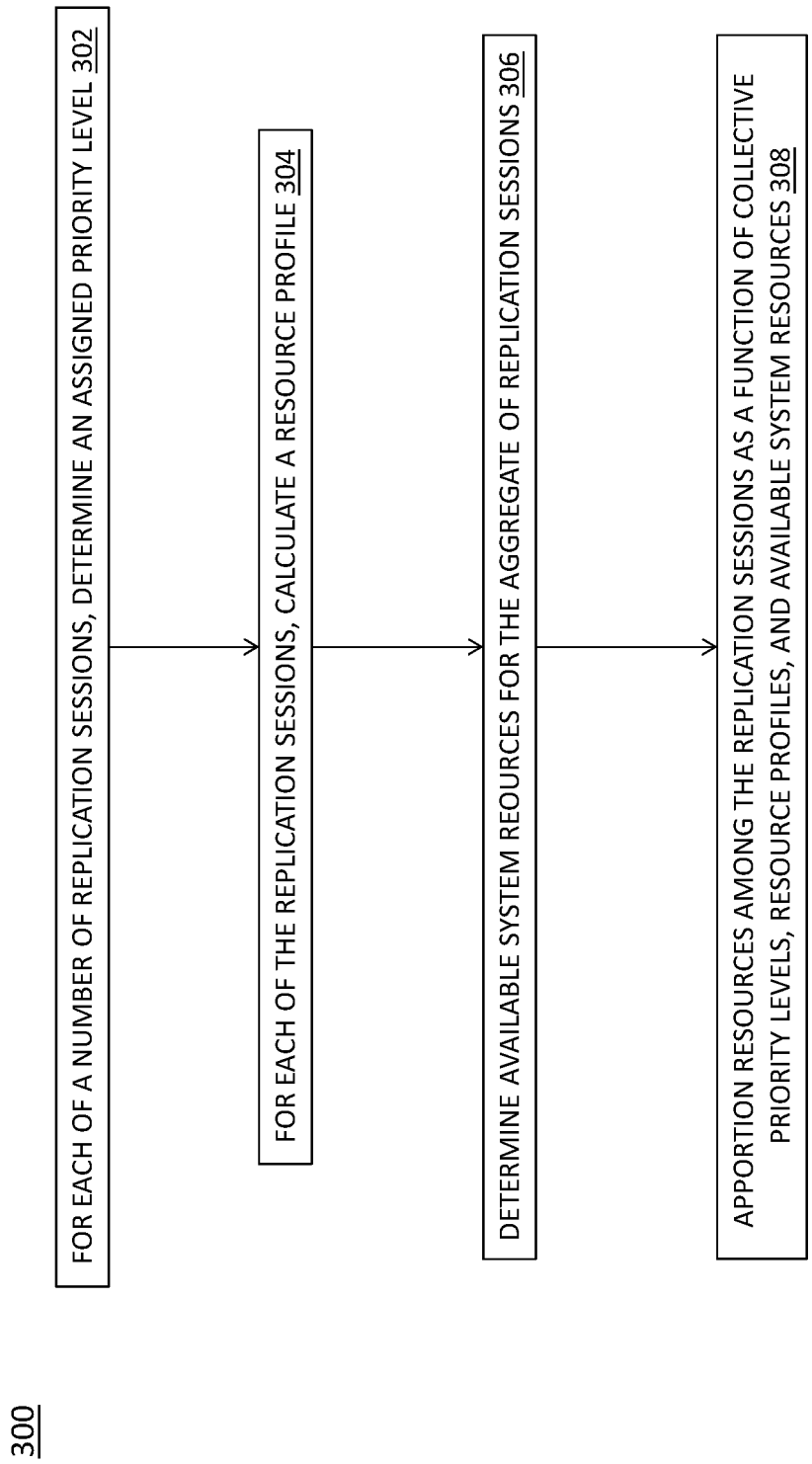

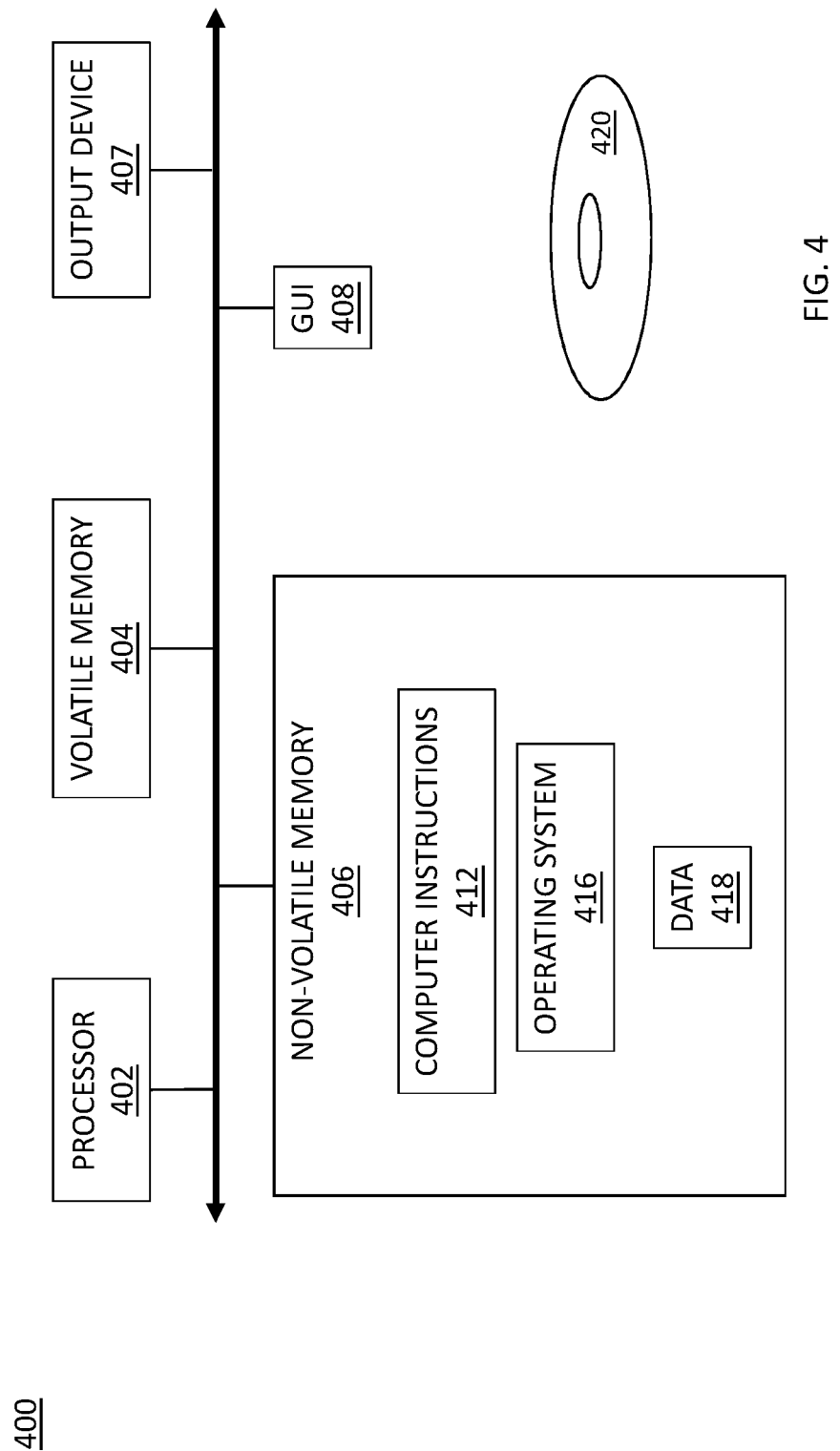

ENHANCED QUALITY OF SERVICE (QOS) FOR MULTIPLE SIMULTANEOUS REPLICATION SESSIONS IN A REPLICATION SETUP

BACKGROUND

One goal of using Quality of Service (QoS) policies in a storage system is to balance the input/output (IO) rate or latency between different storage units in the system. However, despite the use of QoS policies it is oftentimes the case that the actual bandwidth or latency detected in the system is out of balance with the desired QoS bandwidth or latency. This can be due to factors, such as changes in resources needed for each type of IO and/or unanticipated changes occurring in the network a replication set up between two storage systems.

In certain types of replication, such as hash-based replication, it is possible that one session has high deduplication and another session has low deduplication. Replication is bounded by CPU and bandwidth. With high deduplication, a bottleneck is likely to be at the CPU. With low deduplication, the bottleneck is likely to be bandwidth. To reduce bottlenecks, the system may divide up resources; however, without a priori knowledge of required resources, a blind division can lead to unused resources.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for enhanced QoS for multiple replication sessions in a replication set up of a storage system. The method includes, for each of a number of replication sessions simultaneously implemented via the storage system, determining an assigned priority level and calculating a corresponding resource profile. The resource profile specifies a minimum required amount of bandwidth and a minimum amount of input/output (IO) operations for the replication session. The method also includes determining available system resources for an aggregate of the replication sessions. The available system resources indicate a maximum available amount of bandwidth and a maximum available IO rate across the storage system. The method further includes apportioning resources among the replication sessions as a function of collective priority levels, resource profiles, and the available system resources.

Another aspect may provide a system for enhanced QoS for multiple replication sessions in a replication set up for a storage system. The system includes a memory having computer-executable instructions. The system also includes a processor operated by a storage system. The processor executes the computer-executable instructions. When executed by the processor, the computer-executable instructions cause the processor to perform operations. The operations include, for each of a number of replication sessions simultaneously implemented via the storage system, determining an assigned priority level and calculating a corresponding resource profile. The resource profile specifies a minimum required amount of bandwidth and a minimum amount of input/output (IO) operations for the replication session. The operations also include determining available system resources for an aggregate of the replication sessions. The available system resources indicate a maximum available amount of bandwidth and a maximum available IO rate across the storage system. The operations further include apportioning resources among the replication sessions as a function of collective priority levels, resource profiles, and the available system resources.

Another aspect may provide a computer program product for enhanced QoS for multiple replication sessions in a replication set up for a storage system. The computer program product is embodied on a non-transitory computer readable medium. The computer program product includes instructions that, when executed by a computer at a storage system, causes the computer to perform operations. The operations include for each of a number of replication sessions simultaneously implemented via the storage system, determining an assigned priority level and calculating a corresponding resource profile. The resource profile specifies a minimum required amount of bandwidth and a minimum amount of input/output (IO) operations for the replication session. The operations also include determining available system resources for an aggregate of the replication sessions. The available system resources indicate a maximum available amount of bandwidth and a maximum available IO rate across the storage system. The operations further include apportioning resources among the replication sessions as a function of collective priority levels, resource profiles, and the available system resources.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 3 is a flow diagram illustrating a process for implementing enhanced QoS for multiple replication sessions in a replication set up in accordance with an embodiment; and FIG. 4 is a block diagram of an illustrative computer that can perform at least a portion of the processing described herein.

DETAILED DESCRIPTION

Figure 1:
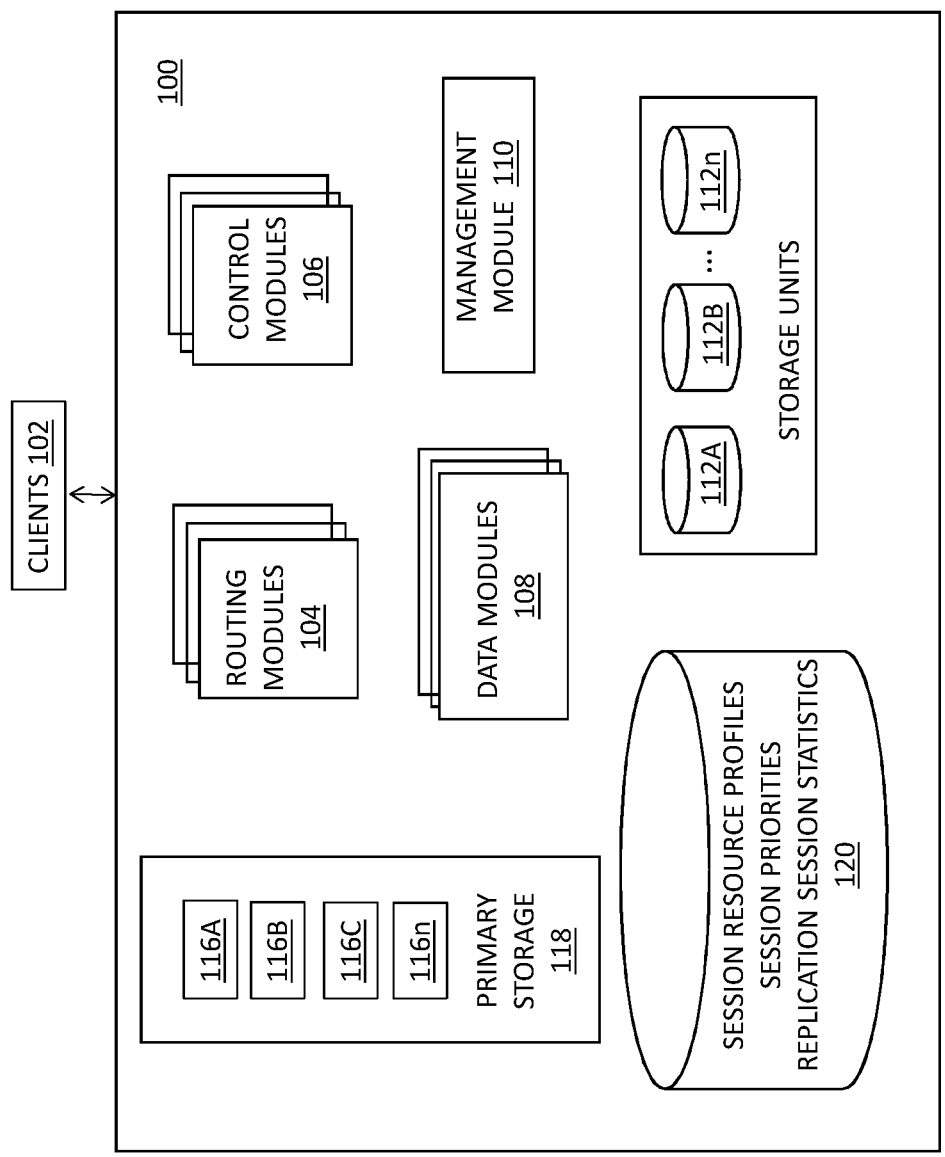
FIG. 1 is a block diagram illustrating one example of a content-based storage system configured for implementing enhanced QoS for multiple replication sessions in a replication set up in accordance with an embodiment.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. An exemplary content addressable storage (CAS) array is described in commonly assigned U.S. Pat. No. 9,208,162 (hereinafter "'162 patent"), which is hereby incorporated by reference).

In certain embodiments, a data storage entity may be any one or more of a file system, object storage, a virtualized device, a logical unit, a logical unit number, a logical volume, a logical device, a physical device, and/or a storage medium.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

As described above, the embodiments described herein provide a technique for implementing enhanced QoS for multiple replication sessions in a replication set up. In a storage system that implements data replication, there are typically many links through which replication requests can be processed. Each of these links may experience differences in throughput and latency due to conditions, such as different media use used for the link, the amount of work already sent to the link, link issues, or load on the target.

The embodiments enable a system operating multiple replication sessions to apportion the available system resources among the individual replication sessions as a function of each session's priority levels, resource profiles, and available system resources. The apportioning enables each of the replication sessions to operate at its optimal requirements while remaining within the constraints of the overall system available resources.

Turning now to FIG. 1, a content-addressable storage system for implementing enhanced QoS for multiple replication sessions in a replication set up will now be described. In an embodiment, the content-addressable storage system may be implemented using a storage architecture, such as XtremIO by EMC DELL of Hopkinton, Mass. For purposes of illustration, the system 100 is described herein as performing replication sessions in any type and/or combination of replication modes (e.g., synchronous, asynchronous, active/active).

The storage system 100 may include a plurality of modules 104, 106, 108, and 110, a plurality of storage units 112A-112n, which may be implemented as a storage array, and a primary storage 118. In some embodiments, the storage units 112A-112n may be provided as, e.g., storage volumes, logical drives, containers, or any units of storage that are exposed to a client or application (e.g., one of clients 102).

In one embodiment, modules 104, 106, 108, and 110 may be provided as software components, e.g., computer program code that, when executed on a processor, may cause a computer to perform functionality described herein. In a certain embodiment, the storage system 100 includes an operating system (OS) (shown generally in FIG. 4), and the one or more of the modules 104, 106, 108, and 110 may be provided as user space processes executable by the OS.

In other embodiments, one or more of the modules 104, 106, 108, and 110 may be provided, at least in part, as hardware, such as digital signal processor (DSP) or an application specific integrated circuit (ASIC) configured to perform functionality described herein. It is understood that the modules 104, 106, 108, and 110 may be implemented as a combination of software components and hardware components. Any number of routing, control, and data modules 104, 106, and 108, respectively, may be implemented in the system 100 in order to realize the advantages of the embodiments described herein.

The routing modules 104 may be configured to terminate storage and retrieval operations and distribute commands to the control modules 106 that may be selected for operations in such a way as to retain balanced usage within the system. The control modules 106 may be communicatively coupled to one or more routing modules 104 and the routing modules 104, in turn, may be communicatively coupled to one or more storage units 112A-112n.

In embodiments, the control modules 106 select an appropriate routing module 104 to send a replication IO request from a client 102. The routing module 104 receiving the replication IO request sends the IO request to a data module 108 for execution and returns results to the control module 106. The requests may be sent using SCSI or similar means.

The control module 106 may control execution of read and write commands to the storage units 112A-112n through the routing modules 104. The data modules 108 may be connected to the storage units 112A-112n and, under control of the respective control module 106, may pass data to and/or from the storage units 112A-112n via suitable storage drivers (not shown).

Data module 108 may be communicatively coupled to corresponding control modules 106, routing modules 104, and the management module 110. In embodiments, the data module 108 is configured to perform the actual read/write (R/W) operations by accessing the storage units 112A-112n attached to them.

As indicated above, the data module 108 performs read/write operations with respect to one or more storage units 112A-112n. In embodiments, the storage system 100 performs replication sessions in synchronous, asynchronous, or metro replication mode in which one or more of the storage units 112A-112n may be considered source devices and others of the storage units 112A-112n may be considered target devices to which data is replicated from the source devices. The storage system 100 may be configured to perform native replication.

The management module 110 may be configured to monitor and track the status of various hardware and software resources within the storage system 100. In some embodiments, the management module 110 may manage the allocation of memory by other modules (e.g., routing modules 104, control modules 106, and data modules 108.

The primary memory 118 can be any type of memory having access times that are faster compared to the storage units 112A-112n. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM. These differing types of memory are shown generally in FIG. 1 as 116A-116n.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Also shown in the system 100 of FIG. 1 is a database 120 that is used to provide session information, such as session resource profile information and assigned session priorities to the system to allocate bandwidth and CPU resources to each of the sessions. The session resource profile information may be derived, in part, from statistical session data. These elements are described further with respect to FIGS. 2 and 3.

Figure 2:
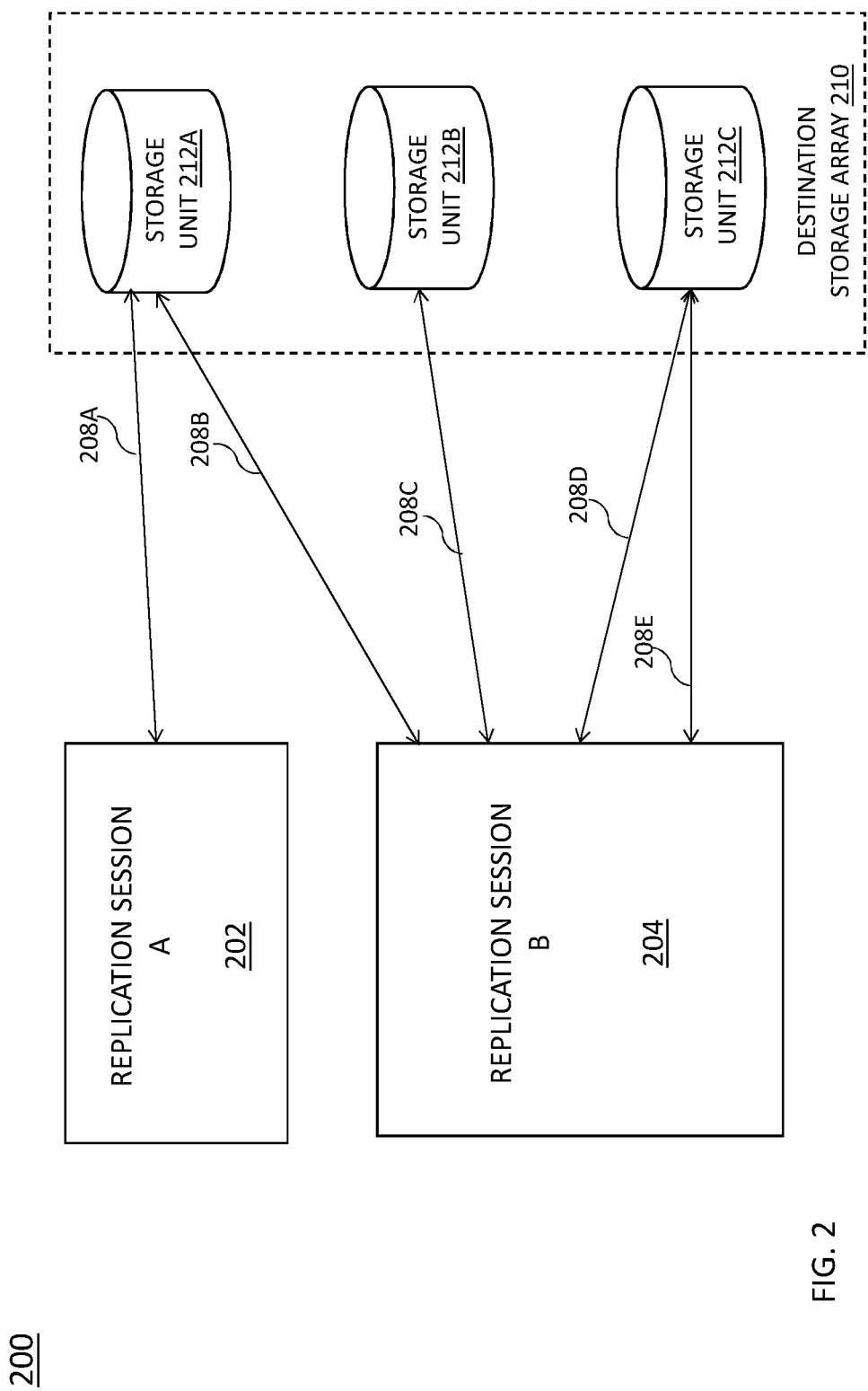
FIG. 2 depicts a block diagram depicting two replication sessions configured for implementing enhanced QoS for multiple replication sessions in a replication set up in accordance with an embodiment.

Turning now to FIG. 2, a portion of a system 200 (e.g., the system 100 of FIG. 1) for implementing enhanced QoS for multiple replication sessions in a replication set up in a replication setup will now be described.

As shown in FIG. 2, the system 200 includes two replication sessions 202 (A) and 204 (B), each of which may be implemented by one or more of the modules shown in FIG. 1. While only two replication sessions are shown in FIG. 2, it will be understood that any number of sessions may be simultaneously implemented in the system in order to realize the advantages of the embodiments described herein.

Also shown in FIG. 2 are links 208A-208E, which communicatively connect each of the sessions A and B to respective storage units 212A-212C. Each of the links may be implemented as serial data cables or wires. In other embodiments, the links may be implemented over a wireless network.

The storage units 212A-212C are storage units of a destination storage array 210 in which data from a source device is replicated to the destination storage array 210. In one embodiment, the destination storage array may be identical to the source storage array; however, this is not required. In an alternative embodiment, for example, the destination storage array may be different than the source storage array (e.g., the destination storage array may have a different architecture or may be manufactured by a different vendor).

Turning now to FIG. 3, a flow diagram 300 for implementing enhanced QoS for multiple replication sessions in a replication set up in a replication setup for multiple active replication sessions will now be described in accordance with an embodiment. The process 300 of FIG. 3 assumes that blocks 302 and 304 are performed for each replication session (e.g., session A and session B).

The multiple active replication sessions may be synchronous, asynchronous, or metro modes of replication. In one embodiment, the replication may be hash-based replication. In standard, non hash-based replication, user data is transported to the target without any changes, or compression (e.g., an 8 KB page of user data may be transported as 8 KB if not compressed and 5 KB when compressed). While compression saving is significant, the compressed data still requires significant bandwidth. With hash-based replication, it may be possible to transfer an 8 KB page of user data by sending a few bytes, such as 20 bytes of SHA1 signature. This eliminates almost completely any bandwidth requirements. However, to achieve this highly desirable savings, the page being transferred needs to be on the target, the source needs to be able to recognize that the page is on the target, the target needs to be able to verify that a hash signature is indeed representing a page that already resides on the target, and a backup mechanism must be in place in case the hash-based transfer fails (i.e., the hash ends up missing on target, requiring a normal full page or compressed page transfer). This means that hash-based transfer requires multiple round-trip IO across the replication links, and as a result, is more CPU intensive. Moreover, different sessions may see different benefits, as the chances of having a hash signature that already exists on target highly depends on the type of data being transferred. For example, while one session may transfer Virtual Desktop Images that have a high likelihood of deduplication, resulting in many hash-based transfers, another session may transfer database or image data, that has low likelihood of deduplication. Thus, different sessions may have different benefits from hash-based replication.

In block 302 of FIG. 3, for each of a number of replication sessions, the process 300 determines a priority level assigned to that session. In a replication set up, one goal of Quality of Service (QoS) is to balance the IO rate or latency between different storage elements on the same array based on different policies. For instance, a preferred user may end up consuming fewer resources than a lower priority user due to the lower priority user pushing in a lot more IO. In this instance, the preferred user would experience lower performance and higher latency. There are a couple of ways to enable QoS: limiting the host bandwidth per client (maximum-based QoS), and assigning different levels of service (e.g., Platinum, Gold, Silver, etc.) and trying to prioritize host bandwidth based on the levels of service using different queues in the scheduler for each type. It will be understood that in some instances, the same priority may be assigned to one or more sessions. In other set ups, there may be multiple levels of priority (e.g., 1-10, where 10 is the maximum) set for different sessions.

In block 304, the process 300 calculates, for each replication session, a corresponding resource profile that is specific to that session. The resource profile specifies an amount of bandwidth and IO operations required for the session. The amount of bandwidth required corresponds to user data as opposed to other types of data, such as application data that is generated by the replication engine. Typically, it is mostly user data that is sent on the links as compared to application data. Application data may include hash signatures, information about the replication state, address and volume identifiers for replication data, etc. The resource profiles may be calculated for varying levels of deduplication among the replication sessions. These levels of deduplication are described further herein. The amount of bandwidth and IO operations required for a session may be calculated by collecting statistical information about previous replication sessions, such as the number of IO operations performed, the size of the IO operations, and the amount of user data transmitted.

In block 306, the process 300 determines the available system resources for the aggregate of the replication sessions. The available system resources may specify the maximum amount of bandwidth and IO rate available for the system.

In block 308, the process 300 apportions the available system resources (from block 306) among the individual replication sessions as a function of the priority levels, resource profiles, and available system resources. The apportioning enables each of the replication sessions to operate at their optimal requirements while remaining within the constraints of the overall system available resources. This process 300 is performed in an iterative fashion over time as bandwidth requirements can change periodically.

An example of the process 300 will now be described with respect to particular priorities, profiles, and system resources. Consider a replication set up that is capable of operating at 200 MB/sec and 1,000 replication round trip messages per second using one or more links. Using the system 200 of FIG. 2, it is assumed that there are two simultaneous replication sessions A and B. The profile of session A is low deduplication, where 1 MG of user data equals 1 MB on the link 208A with a single round trip. The profile of session B is very high deduplication, where 1 MB of user data equals 50 KB on the links 208B-208E with four round trips.

In order for session A to transfer X MB of user data, it must consume X MB/sec of bandwidth and X round trip messages per second. In order for session B to transfer Y MB of user data, it must consume Y*0.05 MB/sec of bandwidth and 4*Y round trip messages per second. Thus, to be able to meet the above-referenced system resources, the requirements are X+Y*0.05<=200, X+4*Y<=1,000.

In one example, suppose session A has the same priority as session B. Therefore it is desirable that they both transfer user data at the same rate. Hence, X=Y. Solving the above for maximizing X and Y we get approximately X=Y=190. This means that both sessions can work simultaneously, each transmitting 190 MB/sec of user data. Of course, the first session will also transmit 190 MB/sec on the link and consume 190 round trip messages per second, while the second one will transmit only 9.5 MB/sec on the link while consuming 760 round trip messages per second. Together, the two sessions are within the available resources. The rates established above are the maximum available under the given constraints. It is clear that in this example the bottleneck is the link bandwidth—the two sessions reach 199.5 MB/sec on the links.

In a separate example, suppose A and B have the same profile as above, but session B has a priority that is double of session A. In this case, Y=2*X. Solving the equations, it is evident that the bottleneck is with the CPU (X=111, Y=222). In other words, session A will transmit 111 MB/sec of user data while consuming 111 MB/sec on the link and 111 round trip messages per second. Session B will transmit 222 MB/sec of user data while consuming 111 MB/sec on the link and 888 round trip messages per second. Together the two sessions use up almost all of the available round trip messages per second resources of the storage system (999 round trip messages per second).

A formula for calculating the above processes will now be described. Given n replication sessions determine for each replication session its priority $P_1, \ldots, P_n$. This can be a user input, or a default. Priorities may range, e.g., from 1-10 (where 10 is the highest priority). For each replication session its replication resources profile is determined: for session i, in order to transmit 1 MB of user data, determine how many MB $M_i$ are required to transmit over the link, and how many IO operations $C_i$. Determine the available system resources is determined as the maximal available bandwidth M and maximal available IO rate C; here M is measures as MB/sec, and C is measured as round trip messages per second.

Let $X_1, \ldots, X_n$ represent the throughput of sessions $1, \ldots, n$ measured in MB/sec of user data.

$$Xi/Pi = Xj/Pj \text{ for all } i,j \tag{a}$$

$$\text{SUM}(Xi*Mi) < M \tag{b}$$

$$\text{SUM}(Xi*Ci) < C \tag{c}$$

The first equation results in a single parameter X. For example, X can be set as X=X1 and Xj=Pj*X/P1 (where P1 is the lowest priority that can be assigned). Maximizing Xi under constraints (b) and (c) results in the following formula for X. This in turn determines X1, . . . , Xn:

$$R1 = M/\text{SUM}(Pi*Mi/P1)$$

$$R2 = C/\text{SUM}(Pj*Ci/P1)$$

$$X = \text{MIN}(R1, R2)$$

Replication is constrained by both bandwidth and CPU. R1 is related to the constraints on replication resulting from bandwidth and represents a scaling factor that takes into consideration the entire bandwidth M as well as all the bandwidth used by the different sessions. Similarly, R2 is related to the constraint on replication resulting from CPU and represents a scaling factor that takes into consideration the entire CPU utilization as measured by maximal possible round trip messages per second C as well as all the round trip messages per second used by the different sessions. By using these two scaling factors, two different resources (bandwidth and CPU) can be put into a single formula. This enables a means to compare, in a generic way, two otherwise disparate factors by converting them into a generic format.

FIG. 4 shows an exemplary computer 400 (e.g., physical or virtual) that can perform at least part of the processing described herein. The computer 400 includes a processor 402, a volatile memory 404, a non-volatile memory 406 (e.g., hard disk or flash), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for enhanced quality of service (QoS) for multiple replication sessions in a replication setup of a storage system, the method comprising:
for each of a number of replication sessions simultaneously implemented via the storage system:
determining, by a processor-based system, an assigned priority level; and
calculating, by the processor-based system, a corresponding resource profile, the resource profile specifying a minimum required amount of bandwidth and a minimum amount of input/output (IO) operations for the replication session;
determining, by the processor-based system, available system resources for an aggregate of the replication sessions, the available system resources indicating a maximum available amount of bandwidth and a maximum available IO rate across the storage system; and
apportioning, by the processor-based system, resources among the replication sessions as a function of collective priority levels, resource profiles and the available system resources such that each of the replication sessions operate at their optimal requirements while remaining within the constraints of the overall system available resources.

2. The method of claim 1, wherein the resource profile is calculated for varying levels of deduplication among the replication sessions.

3. The method of claim 1, wherein the calculating the resource profile includes collecting statistical information on previous replication sessions, the statistical information including a number of IO operations performed, a size of the IO operations, and an amount of user data corresponding to the IO operations.

4. The method of claim 1, wherein the required bandwidth corresponds to user data.

5. The method of claim 1, wherein the assigned priority level differs among the replication sessions.

6. The method of claim 1, wherein the replication sessions are hash-based replication sessions.

7. A system for implementing enhanced quality of service (QoS) for multiple replication sessions in a replication setup of a storage system, the system comprising:
a memory comprising computer-executable instructions; and
a processor operable by a storage system, the processor executing the computer-executable instructions, the computer-executable instructions when executed by the processor cause the processor to perform operations comprising:

for each of a number of replication sessions simultaneously implemented via the storage system:
  determining an assigned priority level; and
  calculating a corresponding resource profile, the resource profile specifying a minimum required amount of bandwidth and a minimum amount of input/output (IO) operations for the replication session;
determining available system resources for an aggregate of the replication sessions, the available system resources indicating a maximum available amount of bandwidth and a maximum available IO rate across the storage system; and
apportioning resources among the replication sessions as a function of collective priority levels, resource profiles and the available system resources such that each of the replication sessions operate at their optimal requirements while remaining within the constraints of the overall system available resources.

8. The system of claim 7, wherein the resource profile is calculated for varying levels of deduplication among the replication sessions.

9. The system of claim 7, wherein the calculating the resource profile includes collecting statistical information on previous replication sessions, the statistical information including a number of IO operations performed, a size of the IO operations, and an amount of user data corresponding to the IO operations.

10. The system of claim 7, wherein the required bandwidth corresponds to user data.

11. The system of claim 7, wherein the assigned priority level differs among the replication sessions.

12. The system of claim 7, wherein the replication sessions are hash-based replication sessions.

13. A computer program product for implementing enhanced quality of service (QoS) for multiple replication sessions in a replication setup of a storage system, the computer program product embodied on a non-transitory computer readable medium, the computer program product including instructions that, when executed by a computer, causes the computer to perform operations comprising:
for each of a number of replication sessions simultaneously implemented via the storage system:
  determining an assigned priority level; and
  calculating a corresponding resource profile, the resource profile specifying a minimum required amount of bandwidth and a minimum amount of input/output (IO) operations for the replication session;
determining available system resources for an aggregate of the replication sessions, the available system resources indicating a maximum available amount of bandwidth and a maximum available IO rate across the storage system; and
apportioning resources among the replication sessions as a function of collective priority levels, resource profiles and the available system resources such that each of the replication sessions operate at their optimal requirements while remaining within the constraints of the overall system available resources.

14. The computer program product of claim 13, wherein the resource profile is calculated for varying levels of deduplication among the replication sessions.

15. The computer program product of claim 13, wherein the calculating the resource profile includes collecting statistical information on previous replication sessions, the statistical information including a number of IO operations performed, a size of the IO operations, and an amount of user data corresponding to the IO operations.

16. The computer program product of claim 13, wherein the required bandwidth corresponds to user data.

17. The computer program product of claim 13, wherein the assigned priority level differs among the replication sessions.

18. The computer program product of claim 13, wherein the replication sessions are hash-based replication sessions.

* * * * *